Patented Oct. 15, 1940

2,218,077

UNITED STATES PATENT OFFICE

2,218,077

RESINOUS CONDENSATION PRODUCTS AND PROCESS OF MAKING SAME

Werner Zerweck and Karl Keller, Frankfort-on-the-Main-Fechenheim, Germany, assignors, by mesne assignments, to General Aniline & Film Corporation, New York, N. Y., a corporation of Delaware No Drawing. Application November 26, 1937, Serial No. 176,656. In Germany November 28, 1936

4 Claims. (Cl. 260—72)

Our invention relates to new resinous condensation products and process of making same. We have found that new and valuable resinous condensation products are obtained by condensing compounds containing in the molecule once or twice a five-membered heterocyclic ring system, the group $$\begin{array}{c} X-N-C=N- \\ | \quad | \\ H \end{array}$$

wherein X is hydrogen or $NH_2$, being twice present, which compounds therefore correspond to the general formulae:

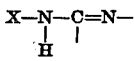

or

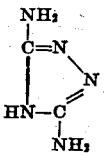

wherein X has the above significance and R means $$-\overset{|}{N}-\text{or}-\overset{\|}{C}-$$

with aliphatic aldehydes of a low molecular weight or agents setting free such aldehydes.

The condensation can be carried out in a neutral, acid or alkaline medium, in liquors or melts of organic or inorganic nature. The aldehyde may be used in solid or dissolved form.

Compared with the known aniline-formaldehyde resins the resinous condensation products of the present invention are distinguished by a good electrical insulating power, a high degree of resistance towards water and light and by being colorless. They are well adapted for the manufacture of moulded articles and can be worked up by adding filling materials and dyestuffs of various kinds. When they are used for making lacquers and for impregnation they have the advantage of yielding coatings which are resistant towards water and light. Moreover the present condensation products are adapted for preparing adhesive and gluing agents of various kinds and for being produced on textile fibers.

On mixing the diamino-compounds of the above type with other compounds usual for the aldehyde condensation such as urea, thiourea, phenol, dicyandiamide and the like and employing the mixture in the present process, mixed condensation products are obtained which exhibit the favourable properties of the above described condensation products.

In order to further illustrate our invention the following examples are given, the parts being by weight and all temperatures in degrees centigrade.

Example 1

10 parts of guanazole of the formula:

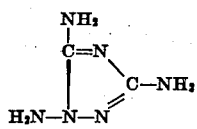

are dissolved in about 15 parts of water with the addition of 1 to 2 parts of pyridine. Then 25 parts of an aqueous formaldehyde solution of 30% strength are added and the mixture is heated for a short time to gentle boiling. Then water is distilled off, advantageously in vacuo, and the remaining resin is maintained for some time at a temperature from 100 to 110°. A transparent and hard product, which strongly repels water, is obtained.

When replacing guanazole by a corresponding quantity of aminoguanazole of the formula:

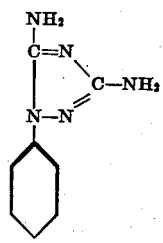

or of phenylguanazole of the formula:

likewise condensation products of valuable properties are obtained.

Example 2

14 parts of dihydrazoamidopyrrodiazole of the formula:

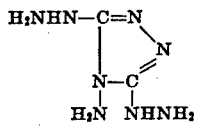

are dissolved in little water and about 3 parts of pyridine and 25 to 30 parts of an aqueous formaldehyde solution of 30% strength are added, the mixture is heated shortly at about 80° and the water is evaporated in vacuo. The remaining resin is hardened at about 100°. A hard and transparent product of a very remarkable resistance to water is obtained.

Example 3

A mixture of 10 parts of 3.5-diaminopyrazole of the formula:

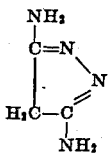

and about 30 parts of an aqueous formaldehyde solution of 30% strength is warmed until a total solution has occurred. Then the water is distilled off and the remaining resin is hardened at temperatures advantageously above 100°. The formed product is likewise very resistant to water.

Example 4

A mixture of 15 parts of guanazole, 10 parts of paraformaldehyde, 2 parts of pyridine and about 85 parts of butylalcohol is heated to boiling. To the filtrated clear solution of the resin about 2 parts of butylphtalate as softening agent are added. Such a resinous solution is very well adapted as coating, adhesive and impregnating substance and may be used for moulding films.

Example 5

A mixture of 10 parts of guanazole, 40 parts of formaldehyde of 20% strength and 2.5 parts of pyridine is shortly boiled, then a part of the water is distilled off at about 70° and the viscous resinous solution is mixed with 25 parts of finely powdered quartz. The formed mass is entirely dried and milled. The press powder thus formed can be converted by heating under pressure already at temperatures of about 100° into articles of a good solidity and resistance to heat and water.

Example 6

A mixture of 30 parts of urea and 100 parts of neutralized formaldehyde of 30% strength is heated for about 3 hours to boiling. When cool 10 parts of guanazole in the form of a concentrated aqueous solution and 40 parts of cellulose are added. The mass is dried and disintegrated. It yields by heating under pressure articles of an essentially higher resistance to water than that of a resin containing only urea.

The herein used urea may be replaced by the corresponding amount of thiourea, dicyandiamide, phenol and the like or mixtures thereof.

Example 7

A mixture of 12 parts of guanazole, 10 parts of propylaldehyde, 4 parts of a formaldehyde solution of 30% strength, 1 part of pyridine and 10 parts of wood powder, which has been well mixed for about 1 to 2 hours, is dried at about 50 to 60°. In this manner likewise very hard articles of a good resistance to water are obtained.

Example 8

35 parts of phenyl guanazole are mixed with a mixture of 40 parts of water and about 7 parts of pyridine. The mixture is heated at 40 to 45° and while stirring 120 parts of formaldehyde of 40% strength are added. Shortly a clear solution of the methylol compound of phenylguanazole is formed. A mixture of 80 parts of butanol and 25 parts of toluene is added while stirring at about 90–95°. After having removed a part of water and toluene in a suitable manner 0.4 part of phthalic acid anhydride are added taking care for a far-reaching dehydration of the reaction mass. The remaining clear butanolic solution of the condensation product is freed, if necessary, from impurities by filtration. About 125 parts of a clear viscous solution of the condensation product are obtained. It can be diluted to any desired degree by means of butanol or other alcohols, of mixtures of alcohols and benzene, toluene etc., of acetone and other solvents; likewise it may be mixed with coatings consisting of nitrocellulose, etc.

When laying a solution diluted for example with acetone on a substratum of glass or metal, after evaporation a colorless, transparent lustrous coating of a good resistance to water is obtained which may be hardened by standing for a longer time or more rapidly by heating to higher temperatures. The coating thus hardened is lustrous and particularly resistant to water. A further advantage thereof consists in fact, that it is difficultly combustible and entirely resistant to the usual organic solvents such as benzine.

Example 9

20 parts of guanazo-guanazole of the formula:

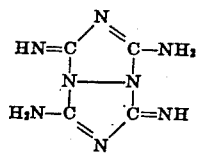

which may be prepared by boiling a mixture of an aqueous solution of guanazole-monohydrochloride and dicyandiamide, are mixed with about 20 parts of water, 30 parts of formaldehyde of 30% strength and 1 to 2 parts of sodium carbonate and the mixture is heated for some time to gentle boiling. The water is evaporated and the remaining resin is heated for some time at about 110°. A resin similar to those obtained according to the foregoing examples is obtained.

A similar product is obtained by starting from imidurazoguanazole of the formula:

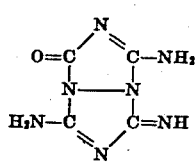

Example 10

35 parts of phenylguanazole are dissolved in a mixture of 90 parts of neutralized formaldehyde of 40% strength and 3 parts of pyridine at 30 to 35°. This solution is added to 75 parts of glycol, which have been warmed to about 100°. While stirring water is distilled off. When the mixture has reached a temperature of about 130°, the distillation is stopped, and after cooling a little the clear solution may be freed from some impurities by filtration. In this manner about 140 parts of a viscous solution are obtained, which can be mixed with an aqueous alcohol of about 25% strength to a clear solution which can be used as finishing or sizing agent. When varying the reaction conditions in a suitable manner a product is obtained which is soluble in water without addition of alcohol.

We claim:

1. Resinous condensation products obtained by condensing an aliphatic aldehyde containing at the most 3 carbon atoms with a member of the group consisting of compounds of the formulae:

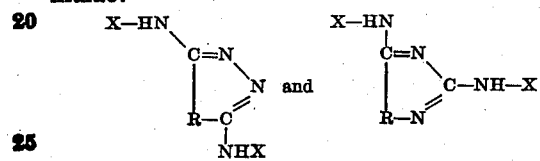 and

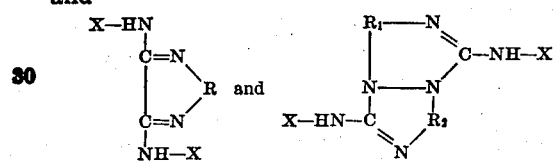

and

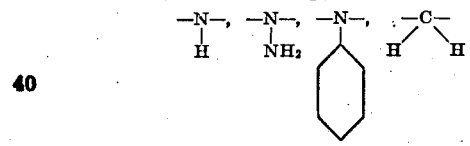

wherein X is a member of the gruop consisting of hydrogen and NH₂, R stands for a member selected from the group consisting of $$-\underset{H}{N}-, \quad -\underset{NH_2}{N}-, \quad -\underset{H}{N}-, \quad -\underset{H}{C}-$$

R₁ stands for a member of the group consisting of $$\underset{NH}{\overset{\parallel}{C}} \text{ and } \underset{O}{\overset{\parallel}{C}},$$

and R₂ stands for

 and $\underset{NH}{\overset{\parallel}{C}}$ which condensation products are characterized by good electrical properties, resistance to water, heat and light, by colorlessness, which products are adapted for the uses as lacquers, gluing agents, for the manufacture of pressed articles and for being produced on textile fibers.

2. A resinous condensation product obtained by condensing formaldehyde with guanazole of the formula:

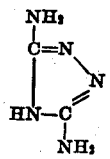

which condensation product is a transparent and hard product, which strongly repels water, yields when mixed with fillers pressed articles of a good solidity and resistance to heat and water and is in form of a resinous solution well adapted as coating, adhesive and impregnating substance.

3. A resinous condensation product obtained by condensing formaldehyde with phenylguanazole of the formula:

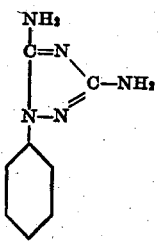

which condensation product is a transparent and hard product, which strongly repels water and yields in the form of a butanolic solution a colorless, transparent lustrous coat of a good resistance to water and is in form of a resinous solution well adapted as coating, adhesive and impregnating substance.

4. A resinous condensation product obtained by condensing formaldehyde with guanazoguanazole of the formula:

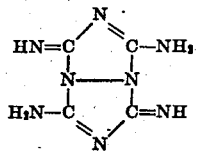

which condensation product is a transparent and hard product which strongly repels water, yields when mixed with fillers pressed articles of a good solidity and resistance to heat and water and is in form of a resinous solution well adapted as coating, adhesive and impregnating substance.

WERNER ZERWECK.
KARL KELLER.